(12) United States Patent
Hagny et al.

(10) Patent No.: US 10,045,477 B2
(45) Date of Patent: Aug. 14, 2018

(54) SEED FIRMING ASSEMBLY FOR AGRICULTURAL SEEDERS AND MOUNTING SYSTEM THEREFOR

(71) Applicants: Matthew P. Hagny, Bel Aire, KS (US); Benjamin K. Thompson, Osage City, KS (US)

(72) Inventors: Matthew P. Hagny, Bel Aire, KS (US); Benjamin K. Thompson, Osage City, KS (US)

( * ) Notice: Subject to any disclaimer, the term of this patent is extended or adjusted under 35 U.S.C. 154(b) by 146 days.

(21) Appl. No.: 15/067,066

(22) Filed: Mar. 10, 2016

(65) Prior Publication Data

US 2016/0262304 A1   Sep. 15, 2016

Related U.S. Application Data

(60) Provisional application No. 62/131,019, filed on Mar. 10, 2015.

(51) Int. Cl.
*A01C 5/06*   (2006.01)

(52) U.S. Cl.
CPC .............. *A01C 5/068* (2013.01); *A01C 5/064* (2013.01)

(58) Field of Classification Search
CPC ........... A01C 5/068; A01C 5/066; A01C 5/06; A01C 5/00; A01C 5/064
See application file for complete search history.

(56) References Cited

U.S. PATENT DOCUMENTS

| | | | |
|---|---|---|---|
| 410,438 A | 9/1889 | Patric et al. | |
| 530,962 A | 12/1894 | Packham | |
| 5,425,318 A | 6/1995 | Keeton | |
| 5,626,196 A * | 5/1997 | Hughes | A01C 5/064 111/191 |
| 5,673,638 A | 10/1997 | Keeton | |
| 6,119,608 A | 9/2000 | Peterson et al. | |
| 6,918,342 B2 | 7/2005 | Sauder et al. | |
| 7,131,384 B2 | 11/2006 | Kester | |
| 7,497,174 B2 | 3/2009 | Sauder et al. | |
| 8,978,584 B2 | 3/2015 | Hagny | |

* cited by examiner

*Primary Examiner* — Christopher J. Novosad
(74) *Attorney, Agent, or Firm* — Jeffrey L. Thompson; Thompson & Thompson, P.A.

(57) ABSTRACT

A seed firming assembly is mounted to a planter by a bracket attached to a seed tube guard between a pair of opener disks. The bracket has first and second sides that define a cavity therebetween for receiving a seed tube. A first mounting structure in front of the cavity secures the bracket to the seed tube guard. A second mounting structure behind the cavity attaches a seed firmer to the bracket with a pivot connection that allows rotation of the seed firmer relative to the bracket about a generally horizontal transverse axis. A stopper bushing limits an extent of forward pivoting of the seed firmer relative to the bracket, and an adjustable tensioner mechanism limits an extent of rearward pivoting. The seed firmer has an upper portion comprising a leaf spring, and a lower portion comprising a material that has a higher abrasion resistance than the upper portion.

22 Claims, 5 Drawing Sheets

SEED FIRMING ASSEMBLY FOR AGRICULTURAL SEEDERS AND MOUNTING SYSTEM THEREFOR

RELATED APPLICATIONS

This application claims priority of Applicant's U.S. Patent Provisional Patent Application No. 62/131,019 filed on Mar. 10, 2015. The entire content of this prior application is hereby incorporated by reference.

BACKGROUND OF THE INVENTION

Field of the Invention

The present invention relates generally to agricultural seeders that produce open furrows in the soil into which seeds are placed, and more particularly, to an improved sliding seed firmer and method of attaching and operating such firmer for use with seeders in securing seed-to-soil contact.

Description of the Prior Art

Agricultural planting methods continue to evolve in response to widespread adoption of "no-till" or "reduced-till" crop production techniques with greatly reduced dependence on tillage of the soil, and in which the next crop's seeds are often placed directly into the previous crop's stubble or crop residues. No-till or reduced-till seeding differs greatly from seeding into a tilled seedbed. The soil conditions for no-till seeding are typically wetter than those dried by tillage, due to the mulching effect of the crop residue remaining on the soil surface. No-till soils are also typically more structurally stable than tilled soils, as the soil particles are "aggregated" or held together by old roots, fungi, and other organic substances and molecular attractions binding the particles together.

The value of pressing newly planted seeds into the soil has likely been known since the dawn of agriculture, and in-furrow firming wheels were described and depicted at least as early as 1908 in Davis, U.S. Pat. No. 939,812. Some earlier "presser" wheels are taught by Patric et al., U.S. Pat. No. 404,108, issued in 1889, although these firming devices were relatively wide and further rearward than the device described in Davis '812, and essentially allowed (and relied upon) considerable loose soil to slough into the furrow ahead of the firming device, and are more in the vein of a modern 'packer' or 'press' wheel operating upon the soil surface and compressing all of the soil filled over the seed. The different methods and actions of such seed-firming devices on freshly formed furrows and planted seeds becomes still more important in no-till conditions due to the greater structure or resilience of no-till soils as compared to tilled soils, which renders pressing from the soil surface ineffective and damaging to the seed environment. Soils which are eroded or which have otherwise suffered degradation from tillage, as well as soils that naturally have high clay content and/or low organic matter content, will be more susceptible to damage from excessive pressing above the seed, especially when those soils are damp.

In no-till seeding, the wetter and more structured soils generally prevent press wheels on the soil surface from performing the seed-firming and furrow-closing functions adequately. The sidewall of the furrow formed in no-till seeding does not crumble easily like the sidewall in tilled conditions, where the soil had previously been loosened and fluffed by tillage. Accordingly, very high pressures are sometimes applied to the packing or closing wheels in an attempt to squeeze the furrow sidewalls back together. This typically results in poor seedling emergence because the soil in the furrow is more compressed at the surface compared to soil near the seed, sometimes to the extent of having a void immediately above the seed but with extremely compressed soil at the surface. In this instance, seed germination may fail due to the drying of air in the void, or the seedling may leaf underground in the void, or the seedling will encounter great difficulty pushing itself through the dense layer of soil, which will slow and weaken the seedling or even kill it.

Some improvements have been made by separating the seed firming and furrow closing functions. This is typically only possible where the depth-gauging function is already accomplished independently of the packing or closing wheel, as in the configuration where depth-gauging wheels travel alongside the furrow opening discs. Seeds are firmed into the soil in the bottom of the furrow by a narrow rolling wheel or sliding-type firmer exerting a relatively small amount of pressure onto the seed after it has been placed by the furrow opener disks and seed-directing tube.

Sliding seed-firming devices have a long history, appearing (but not described) in 1889 in Patric et al. '108, although as previously discussed, the device was not shaped nor positioned to function in the furrow or what remained of the furrow as the loose tilled soil sloughed back into the furrow after the opening disks had passed. The "presser-foot" is further depicted in Patric et al., U.S. Pat. No. 410,438, and in Packham, U.S. Pat. No. 530,962. More recent inventions have been true in-furrow sliding firmer devices, such as described in Keeton, U.S. Pat. Nos. 5,425,318 and 5,673,638, as well as Peterson et al., U.S. Pat. No. 6,119,608. Many of these sliding firming devices are hindered in their performance by mud or damp soil accumulation on the lower edges, especially if some soil disturbance occurs ahead of the firming device so that it no longer is operating in a 'clean' cut, or if insufficient pressure is applied to the sliding firming device. Soil accumulation on the underside of the firming device can result in dragging of seeds, and in a poor firming action. Sliding firming devices may also exhibit rapid wear in many soil conditions, unless made from exotic materials. Much of the problem derives from the compromise in making the entire sliding firmer out of a single material, such that it must be spring-like properties in its upper portion to create the pressure on the lower end that contacts the seed and soil, yet this lower end must be abrasion resistant for long wear life, and must be slick thereby resisting mud accumulation. Another aspect is that the spring-like properties of most UHMW materials degrades as a result of UV exposure, ground-level ozone, and moisture accumulation.

In attaching sliding firmers to double-disc opener planter designs commonly sold in North America in the past 30 years, the patents by Sauder et al., U.S. Pat. Nos. 6,918,342 B2 and 7,497,174 B2 are relevant in depicting and describing brackets that attach to the bolt or stud holding at least one of the opener disks, then extending rearward to hold a single-piece molded sliding firmer 'tail' in the correct position. Firmer brackets have also been attached to bolt holes in the opener subframe which exist in some planter models for holding the optional opener disk scrapers.

SUMMARY OF THE INVENTION

An object of the present invention is to provide an improved mounting arrangement for a seed firmer assembly.

Further objects of the present invention are to provide a seed firmer assembly that has improved operating characteristics, a long wear life, a durable and convenient mounting system, and that is inexpensive and efficient to manufacture.

To accomplish these and other objects of the invention, a seed firming assembly is mounted to a planter by a bracket attached to a seed tube guard between a pair of opener disks. The bracket has first and second sides that define a cavity therebetween for receiving a seed tube. A first mounting structure in front of the cavity secures the bracket to the seed tube guard. A second mounting structure behind the cavity attaches a seed firmer to the bracket with a pivot connection that allows rotation of the seed firmer relative to the bracket about a generally horizontal transverse axis. A stopper bushing limits an extent of forward pivoting of the seed firmer relative to the bracket, and an adjustable tensioner mechanism limits an extent of rearward pivoting. The seed firmer has an upper portion comprising a flat metal leaf spring, and a lower portion comprising a material that has a higher abrasion resistance than the upper portion.

According to one aspect of the present invention, a seed firming assembly for an agricultural planter is provided, comprising a seed firmer having an upper portion and a lower portion. The upper portion comprises a flat leaf spring formed of a first material and is adapted to be attached to a bracket secured to the planter between a pair of opener disks. The lower portion is attached to the upper portion and adapted to extend downwardly and rearwardly from the upper portion to engage a bottom of the furrow. The lower portion is formed of a second material which has a higher abrasion resistance than the first material.

According to another aspect of the present invention, a seed firming assembly for an agricultural planter is provided, comprising: a bracket having first and second sides that define a cavity therebetween for receiving a seed tube; a first mounting structure in front of the cavity for securing the bracket to the planter between a pair of opener disks of the planter; a seed firmer for firming seeds into soil in a furrow created by the opener disks; and a second mounting structure behind the cavity for attaching the seed firmer to the bracket. The second mounting structure comprises a pivot connection between the seed firmer and the bracket that allows rotation of the seed firmer relative to the bracket about a generally horizontal transverse axis.

According to another aspect of the present invention, a row unit for an agricultural planter is provided, comprising: a planter shank having a pair of opener disks rotatably mounted thereto, a seed tube and seed tube guard positioned between the opener disks, and a bracket having first and second sides that define a cavity therebetween for receiving the seed tube. The bracket is attached to the seed tube guard by a first mounting structure in front of the cavity. A seed firmer is attached to the bracket behind the cavity via a second mounting structure.

Numerous other objects of the present invention will be apparent to those skilled in this art from the following description wherein there is shown and described an embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENTS

A seed firmer assembly 10 according to the present invention will now be described with reference to FIGS. 1 to 5 of the accompanying drawings.

Figure 1:
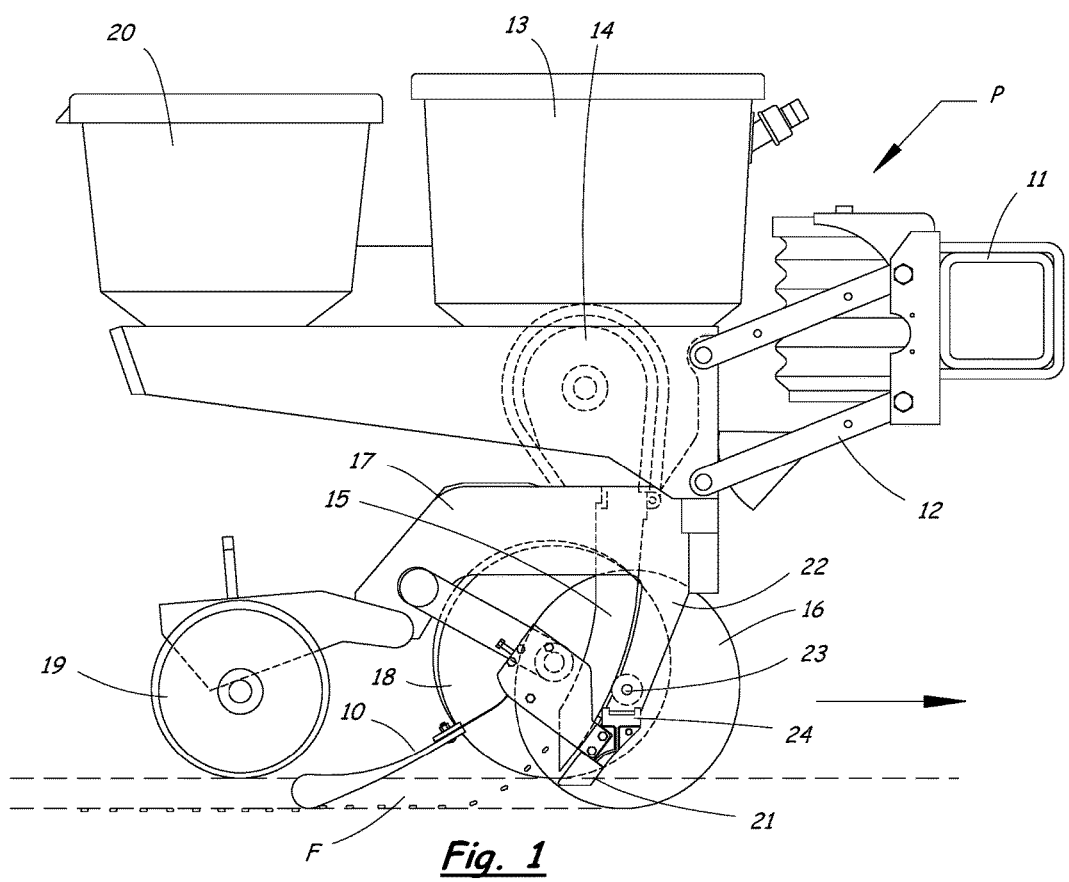
FIG. 1 is a side view of a planter row unit attached to a tool bar by a parallel linkage, with one of the furrow opener discs removed to show the seed tube, seed tube guard, and seed firmer assembly of the present invention.
Figure 2:
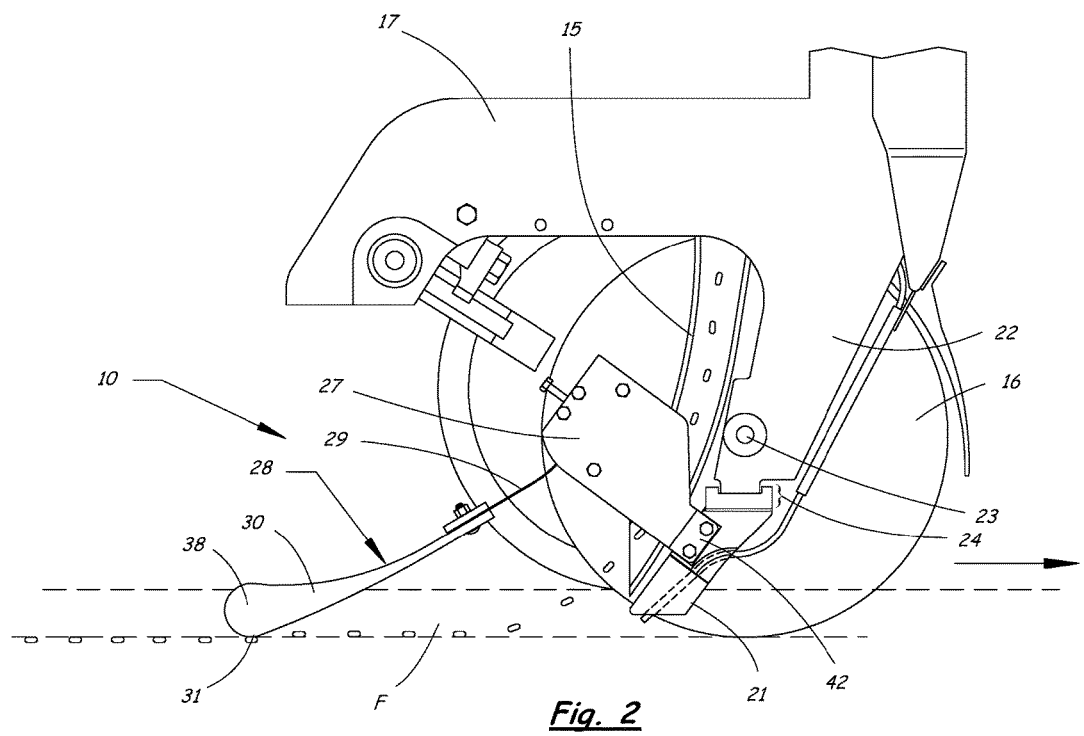
FIG. 2 is a detail view of a portion of the planter row unit shown in FIG. 1.
Figure 3:
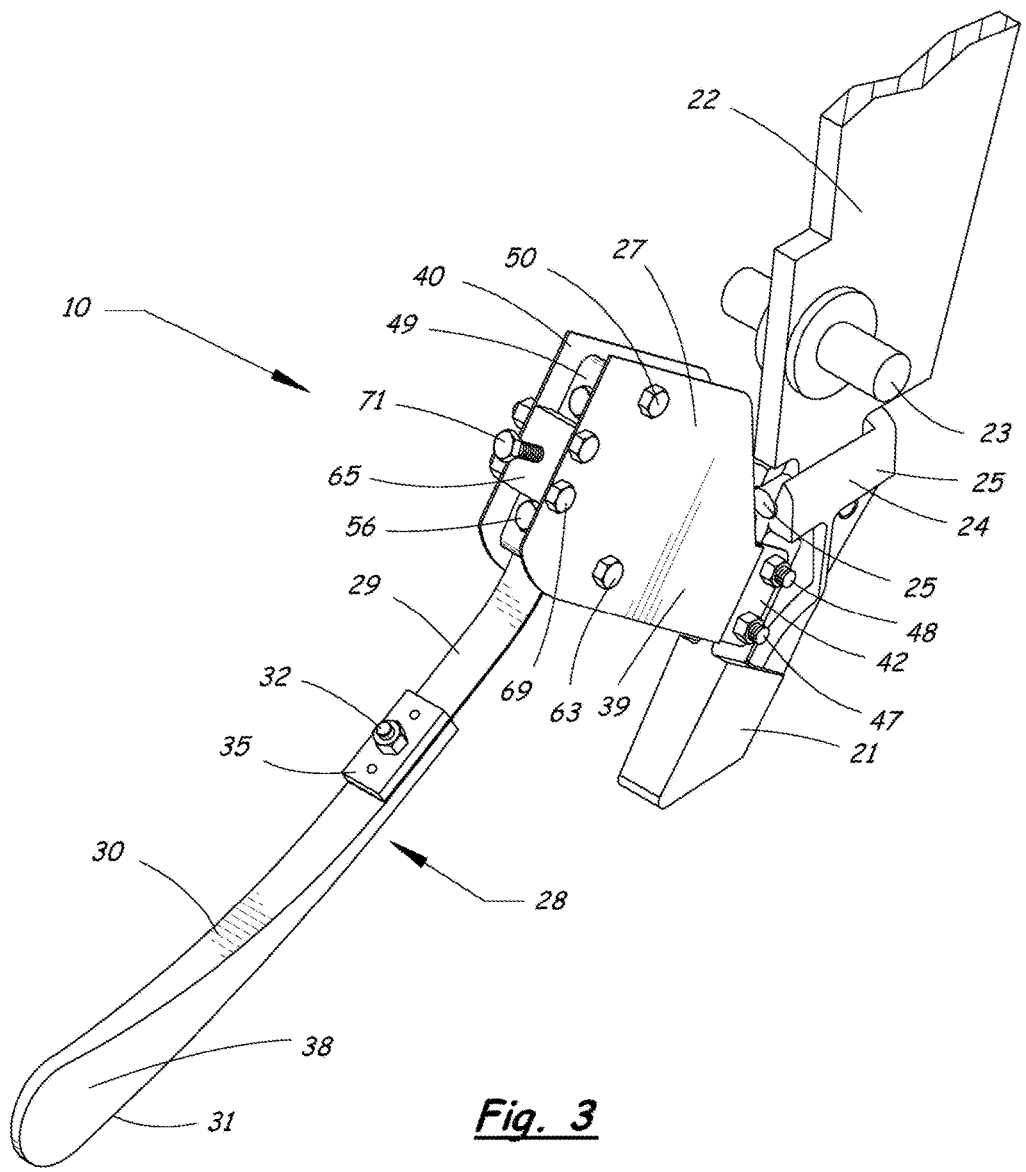
FIG. 3 is a perspective view of the seed tube guard attached to a lower end of a shank assembly of the planter row unit, with the seed firmer assembly of the present invention attached to the seed tube guard.
Figure 4:
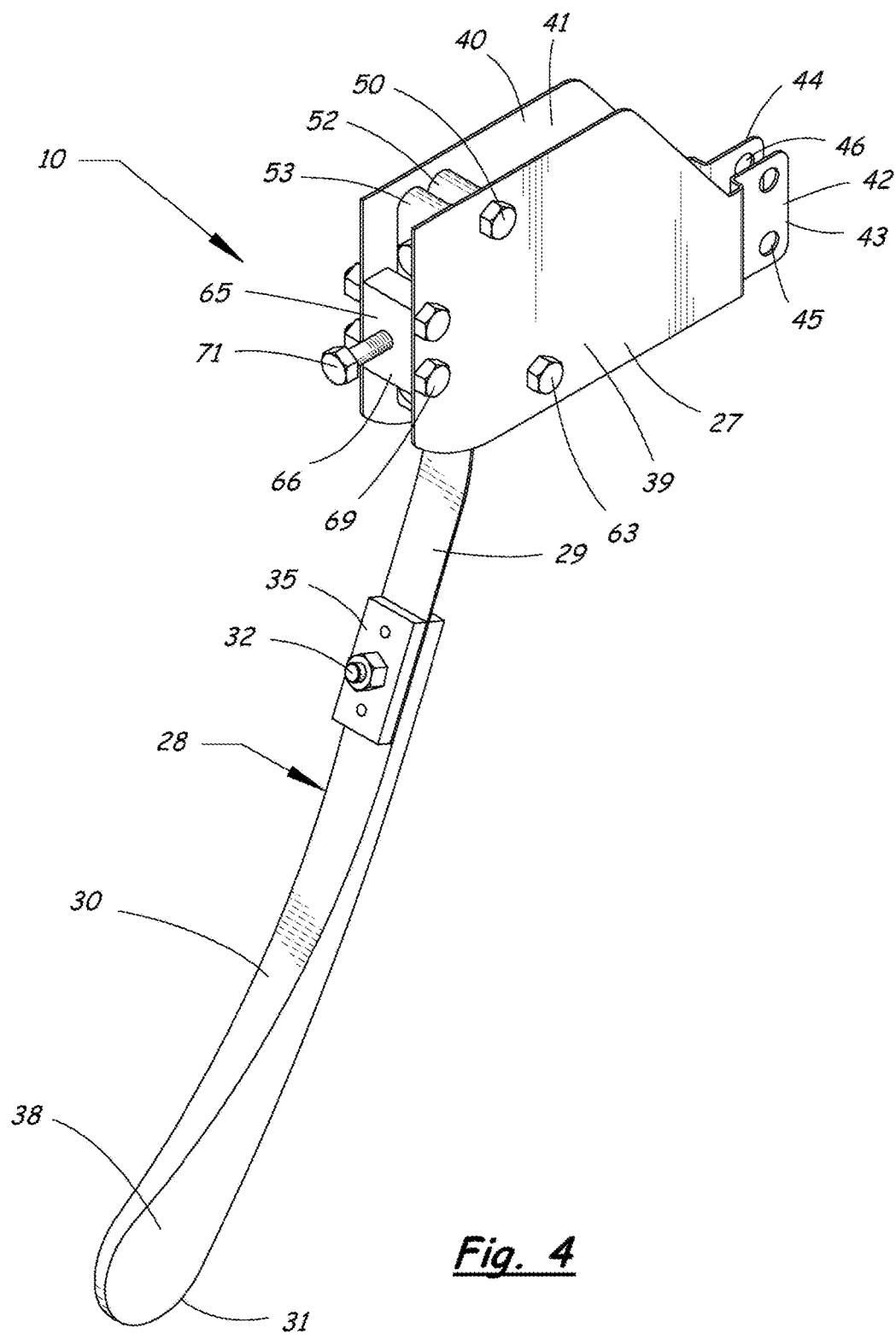
FIG. 4 is a perspective view of the seed firmer assembly of the present invention.
Figure 5:
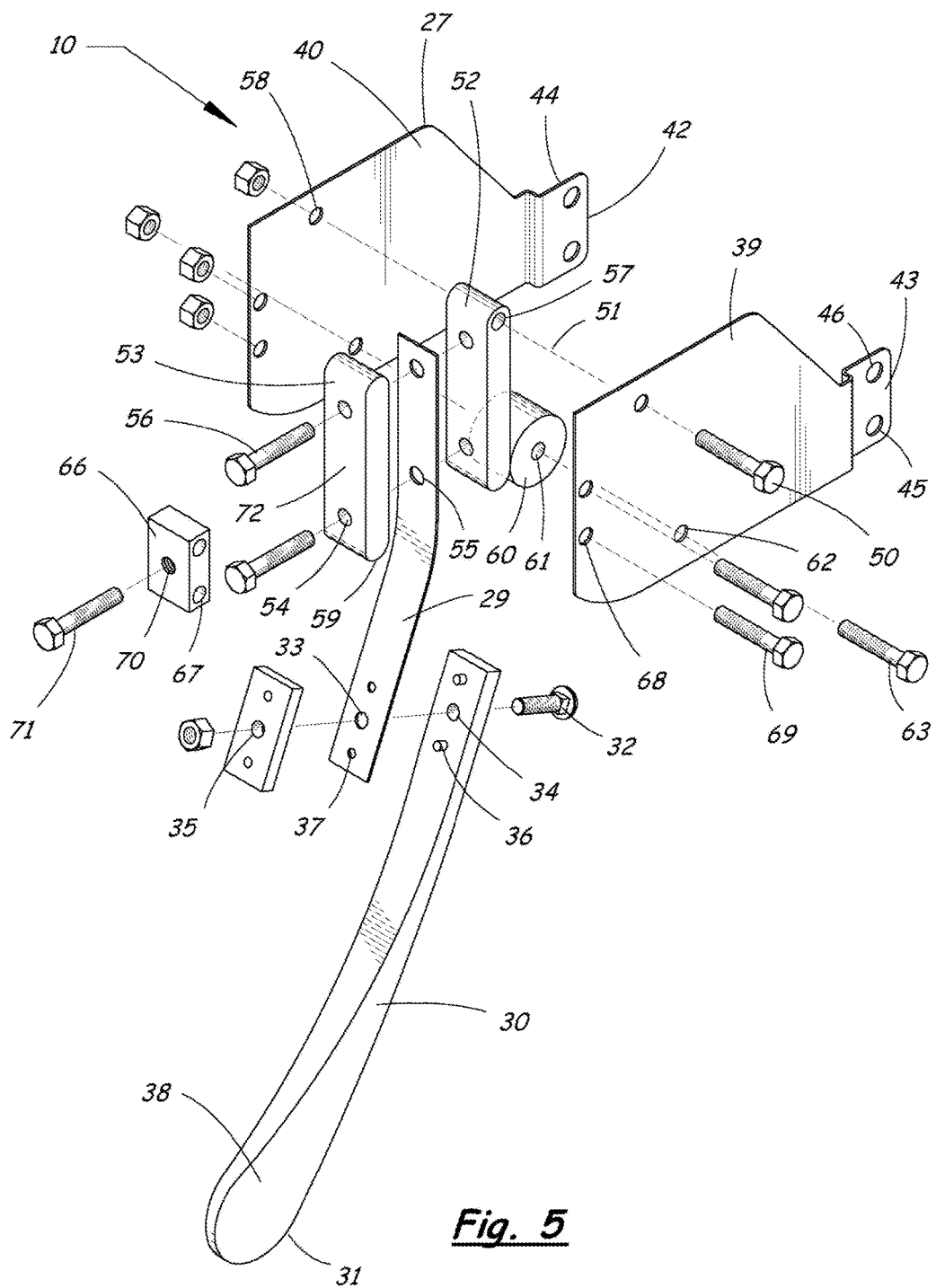
FIG. 5 is an exploded perspective view of the seed firmer assembly of the present invention.

FIG. 1 illustrates a planter row unit P attached to a transverse tool bar 11 by a parallel linkage 12 in a conventional manner. The planter row unit P has a seed bin 13 that holds a supply of seed, and a seed meter 14 at the bottom of the seed bin 13 that singulates and drops seeds into a seed tube 15 for placing the seeds in a seed planting furrow F. The seed planting furrow F is formed by a double disk furrow opener 16 attached to a shank 22 of a row unit subframe 17. Adjustable gauge wheels 18 attached to the subframe 17 control the depth of the furrow opener 16. A furrow closing assembly 19, such as a pair of closing wheels, follows behind the seed tube 15 and furrow opener 16 to close the furrow F and thereby cover the seed with soil. A pesticide bin 20 is also shown on the planter row unit P for applying pesticides, such as insecticides, during the planting operation.

A seed tube guard 21 is positioned immediately in front of the seed tube 15 for protecting the seed tube 15 from contact with the soil or with the discs of the furrow opener 16. The seed tube guard 21 is mounted to the planter shank 22, which is located between the two discs of the furrow opener 16. The discs of the furrow opener 16 are rotatably mounted on respective right and left spindles 23 attached to the planter shank 22 in a conventional manner. A structure 24 is provided for coupling the lower end of the planter shank 22 with the seed tube guard 21. For example, the coupling structure 24 between the planter shank 22 and the seed tube guard 21 may include a twist-on style coupler 25 formed on an upper end of the seed tube guard 21 that mates with a corresponding structure 26 formed on a lower end of the planter shank.

The seed firming assembly 10 is provided for firming seeds into soil in the bottom of the furrow F behind the seed tube 15 and in front of the closing assembly 19. The seed firming assembly 10 has a bracket 27 mounted to the seed tube guard 21 between the discs of the opener 16. A seed firmer 28 has an upper portion 29 mounted to the bracket 27, and a lower portion 30 having a bottom edge 31 that slides along the bottom of the furrow F. The seed firmer 28 extends downwardly and rearwardly from the bracket 27 so that the bottom edge 31 of the lower portion 30 slides along the bottom of the furrow F during operation.

The upper portion 29 of the seed firmer 28 is a flat leaf spring made of a resilient material, such as spring steel. The upper portion 29 does not engage soil during operation so it does not need high abrasion resistance or slickness to minimize wear and/or soil buildup.

The lower portion 30 of the seed firmer 28 is secured to the upper portion 29 by a threaded fastener 32. The threaded fastener 32 extends through a hole 33 near the bottom end of the upper portion 29 and a corresponding hole 34 near the top end of the lower portion 30. A washer block 35 is used with the threaded fastener 32 so that the bottom end of the upper portion 29 is sandwiched between the top end of the lower portion 30 and the washer block 35. A pair of alignment pegs 36 are provided near the top end of the lower portion 30. The alignment pegs 36 extend into corresponding holes 37 near the bottom end of the upper portion 29 to lock the upper and lower portions 29, 30 against rotation relative to each other about the axis of the threaded fastener 32. After passing through holes 37, alignment pegs 36 extend into corresponding holes in washer block 35.

The lower portion 30 has a reduced width and tear drop shape at its bottom end 38. The narrow width and tear drop shape provide a narrow arcuate surface for the bottom edge 31 that slides along the bottom of the furrow F to firm seeds in the bottom of the furrow F during operation.

The lower portion 30 is formed of a second material that has a higher abrasion resistance than the resilient material of the upper portion 29. Since the lower portion 30 engages soil in the furrow F during operation, the high abrasion resistance results in a longer wear life. It is also preferred that the lower portion 30 be formed of a material having a greater slickness than the upper portion 29 to provide greater ability to shed mud without unwanted buildup on the soil engaging surfaces. Suitable materials for the lower portion 30 include resin (e.g., Bakelite), ceramic and/or thermoplastic materials. For example, the lower portion 30 can be formed of a thermoplastic material, such as UHMW or PTFE, both of which have low coefficients of friction and high abrasion resistance that make them suitable for this application.

The bracket 29 has first and second sides 39, 40 that define a cavity 41 therebetween for receiving the seed tube 15. The seed tube 15 extends from the outlet of the seed meter 14 through the cavity 41 to guide seeds from the seed meter 14 into the furrow F.

A first mounting structure 42 in front of the cavity 41 rigidly secures the bracket 27 to the seed tube guard 21. The first mounting structure 42 includes a pair of flanges 43, 44 that extend from a forward end of the bracket 27 and fit on opposite lateral sides of the seed tube guard 21. The seed tube guard 21 has a pair of existing holes that were originally used to mount a seed tube guide to the seed tube guard 21. A pair of holes 45, 46 in the flanges align with the existing holes in the seed tube guard 21. A pair of threaded fasteners 47, 48 extend through the aligned holes to secure the bracket 27 to the guard 21 with the guard 21 sandwiched between the two flanges 43, 44.

The bracket 27 has a second mounting structure 49 behind the cavity 41 for attaching the seed firmer 28 to the bracket 27. The second mounting structure 49 provides a pivot connection 50 that allows rotation of the seed firmer 28 relative to the bracket 27 about a generally horizontal transverse axis 51.

The second mounting structure 49 includes first and second clamping blocks 52, 53 clamped to the upper portion 29 of the seed firmer 28. The first and second clamping blocks 52, 53 each have a pair of holes 54 that are aligned with a corresponding pair of holes 55 through the upper portion 29 of the seed firmer 28. A pair of threaded fasteners 56 extend through the aligned holes 54, 55 to clamp the upper portion 29 of the seed firmer 28 between the first and second clamping blocks 52, 53.

The first clamping block 52 has a laterally extending hole 57 aligned with corresponding holes 58 in the first and second sides 39, 40 of the bracket 27. The pivot connection 50 is provided by a pin member, such as a threaded bolt, extending through the aligned holes 57, 58 to pivotally mount the first clamping block 52 to the bracket 27.

The first and second clamping blocks 52, 53 can be manufactured to be identical to each other to reduce costs of manufacturing and stocking of different parts. The laterally extending hole 57 in the illustrated first clamping block 52 would then also be provided in the second clamping block 53 but not be used. The clamping blocks 52, 53 also have rounded upper and lower ends 59 to reduce stress points on the upper portion 29 clamped between the blocks 52, 53, particularly at the bottom end of the second clamping block 53.

A stopper bushing 60 is arranged between the first and second sides 39, 40 of the bracket 27 in front of the seed firmer 28. The stopper bushing 60 has a laterally extending hole 61 aligned with corresponding holes 62 in the first and second sides 39, 40 of the bracket 27. A threaded bolt 63 extends through the aligned holes 61, 62 in the bracket 27 and the stopper bushing 60 to secure the stopper bushing 60 to the bracket 27. The stopper bushing 60 engages a front surface 64 of the first clamping block 52 to limit an extent of forward pivoting of the seed firmer 28 relative to the bracket 27. When the planter row unit P is raised at the ends of the field the seed firmer 28 will pivot downwardly and forwardly under gravitational force, and the stopper bushing 60 limits the extent of such movement.

An adjustable tensioner mechanism 65 is provided behind the seed firmer 28. The tensioner mechanism 65 includes a tensioner block 66 arranged between the first and second sides 39, 40 of the bracket 27. The tensioner block 66 has a pair of lateral holes 67 that align with corresponding holes 68 in the first and second sides 39, 40 of the bracket 27. A pair of threaded bolts 69 extend through the aligned holes 67, 68 in the bracket 27 and the tensioner block 66 to secure the tensioner block 66 to the bracket 27.

A threaded aperture 70 extends through the tensioner block 66 between and perpendicular to the lateral holes 67. A threaded abutment member 71 extends through the threaded aperture 70 and has one end that abuts the rear surface 72 of the second clamping block and limits an extent of rearward pivoting movement of the seed firmer 28 relative to the bracket 27. The threaded abutment member 71 can be threaded into and out of the tensioner block 66 to adjust the limit of rearward pivoting movement of the seed firmer 28, thereby adjusting the amount of downforce on the seed firmer 28 during operation.

The present invention provides a number of advantages over the prior art. For example, by using different materials for the upper and lower portions 29, 30 of the seed firmer 28, the upper portion 29 can be provided with a greater springiness, while the lower soil-engaging portion 30 can be freed from the springiness constraint. By freeing the lower portion 30 from the springiness constraint, the lower portion 30 can be made of a harder material that maximizes wear-life and slickness or ability to shed mud.

The present invention also provides a unique mounting arrangement in which the seed firmer assembly 10 is attached via the bracket 27 to the seed tube guard 21, which is always aligned with the furrow. For John Deere and AGCO/White planters, and Kinze 2000-series, these seed tube guards already have thin guides protruding rearwardly at the right and left edges of the guard, which serve to keep the plastic seed tube away from harm via abrasion of the opener discs. Some of these OEM guards (not shown) have the guides molded into the casting of the guard, while others have a plastic clip comprising the guide which mates to a corresponding notch in the guard. Aftermarket seed tube guards 21 from RK Products of East Moline, Ill., as well as Exapta Solutions Inc of Salina, Kans. instead utilize either one or two bolt holes in guard 21 for attaching the guide parts. The present invention uses the existing attachment points on the RK and Exapta seed tube guides 21 for a very strong and secure mounting of the seed firmer assembly 10, and the structural sides 39, 40 of the mounting bracket 27 perform the additional function of keeping the seed tube 15 away from the opener discs 16.

Although the present invention has been illustrated and described as being mounted to a row crop planter unit P, it can also be mounted to other seeding equipment, such as grain drills and the like. Accordingly, it should be understood that the invention is not limited to the row crop planter illustrated herein.

While the invention has been specifically described in connection with specific embodiments thereof, it is to be understood that this is by way of illustration and not of limitation, and the scope of the appended claims should be construed as broadly as the prior art will permit.

What is claimed is:

1. A row unit for an agricultural planter, comprising:
   a planter shank having a pair of opener disks rotatably mounted thereto, and a seed tube and seed tube guard positioned between the opener disks;
   a bracket having first and second sides that define a cavity therebetween for receiving said seed tube, said bracket being attached to said seed tube guard by a first mounting structure in front of said cavity;
   a seed firmer for firming seeds into soil in a furrow created by the opener disks; and
   a second mounting structure behind said cavity for attaching said seed firmer to said bracket;
   said seed firmer having an upper portion and a lower portion;
   said upper portion comprising a flat leaf spring attached to said bracket, said upper portion being formed of a first material; and
   said lower portion being attached to said upper portion and extending downwardly and rearwardly from said upper portion to engage a bottom of the furrow, said lower portion being formed of a second material which has a higher abrasion resistance than said first material;
   wherein said second mounting structure comprises a pin member for pivotally mounting said upper portion of said seed firmer to said bracket for rotation about a generally horizontal transverse axis.

2. The row unit according to claim 1, wherein said second mounting structure further comprises first and second clamping blocks, said first and second clamping blocks and said upper portion of said seed firmer have aligned holes, and at least one threaded clamping bolt extends into said aligned holes to clamp said upper portion of said seed firmer between said first and second clamping blocks.

3. The row unit according to claim 2, wherein said first clamping block has a laterally extending hole aligned with corresponding holes in first and second sides of said bracket, and said pin member extends through said laterally extending hole and said corresponding holes in said bracket to pivotally mount said first clamping block to said bracket.

4. The row unit according to claim 1, further comprising a stopper bushing arranged between said first and second sides of said bracket in front of said seed firmer to limit an extent of forward pivoting movement of said seed firmer relative to said bracket.

5. The row unit according to claim 1, further comprising an adjustable tensioner mechanism that limits an extent of rearward pivoting movement of said seed firmer relative to said bracket to adjust an amount of downforce on the seed firmer during operation.

6. The row unit according to claim 5, wherein said tensioner mechanism comprises a tensioner block arranged between said first and second sides of said bracket, and a threaded abutment member extending through said tensioner block for adjustably limiting rearward pivotal movement of said seed firmer relative to said bracket during operation.

7. A row unit for an agricultural planter, comprising:
   a planter shank having a pair of opener disks rotatably mounted thereto, and a seed tube and seed tube guard positioned between the opener disks;
   a bracket having first and second sides that define a cavity therebetween for receiving said seed tube, said bracket being attached to said seed tube guard by a first mounting structure in front of said cavity;
   a seed firmer for firming seeds into soil in a furrow created by the opener disks; and
   a second mounting structure behind said cavity for attaching said seed firmer to said bracket;
   wherein said second mounting structure comprises a pivot connection between said seed firmer and said bracket that allows rotation of said seed firmer relative to said bracket about a generally horizontal transverse axis.

8. The row unit according to claim 7, further comprising first and second clamping blocks that clamp an upper portion of said seed firmer therebetween, one of said clamping blocks being pivotally mounted to said bracket by said pivot connection.

9. The row unit according to claim 8, wherein said first and second clamping blocks and said upper portion of said seed firmer have aligned holes, and further comprising at least one threaded clamping bolt arranged to pass through said aligned holes to clamp said upper portion of said seed firmer between said first and second clamping blocks.

10. The row unit according to claim 8, wherein said first clamping block has a laterally extending hole aligned with corresponding holes in said first and second sides of said bracket, and further comprising a pin member extending through said aligned holes to pivotally mount said first clamping block to said bracket.

11. The row unit according to claim 7, further comprising a stopper bushing arranged between said first and second sides of said bracket in front of said seed firmer to limit an extent of forward movement of said seed firmer relative to said bracket.

12. The row unit according to claim 7, further comprising an adjustable tensioner mechanism that limits an extent of rearward pivoting movement of said seed firmer relative to said bracket to adjust an amount of downforce on the seed firmer during operation.

13. The row unit according to claim 12, wherein said tensioner mechanism comprises a tensioner block arranged between said first and second sides of said bracket, and a threaded abutment member extending through said tensioner block for adjustably limiting rearward pivotal movement of said seed firmer relative to said bracket during operation.

14. The row unit according to claim 7, wherein an upper portion of said seed firmer comprises a leaf spring, and a lower portion of said seed firmer comprises a material that has a higher abrasion resistance than said upper portion.

15. A row unit for an agricultural planter, comprising:
   a planter shank having a pair of opener disks rotatably mounted thereto, and a seed tube and seed tube guard positioned between the pair of opener disks;
   a bracket having first and second sides that define a cavity therebetween for receiving said seed tube, said bracket being attached to said seed tube guard by a first mounting structure in front of said cavity;
   a seed firmer for firming seeds into soil in a furrow created by the pair of opener disks; and
   a second mounting structure behind said cavity for attaching said seed firmer to said bracket;
   said seed tube guard comprising an upper end with a coupling structure provided at said upper end for coupling with a lower end of the planter shank, said bracket is attached to said seed tube guard below said coupling structure by said first mounting structure, and said bracket is not attached above said coupling structure, whereby the seed firmer is attached via the bracket to a portion of the seed tube guard that remains aligned with the furrow.

16. The row unit according to claim 15, further comprising:
   said seed firmer having an upper portion and a lower portion;
   said upper portion comprising a flat leaf spring attached to said bracket, said upper portion being formed of a first material; and
   said lower portion being attached to said upper portion and extending downwardly and rearwardly from said upper portion to engage a bottom of the furrow, said lower portion being formed of a second material which has a higher abrasion resistance than said first material.

17. The row unit according to claim 16, wherein said upper and lower portions of said seed firmer are secured together by a threaded fastener.

18. The row unit according to claim 16, wherein said upper portion of said seed firmer is more resilient than said lower portion.

19. The row unit according to claim 16, wherein said first material is spring steel.

20. The row unit according to claim 16, wherein said second material has a longer wear life and greater slickness than said first material.

21. The row unit according to claim 16, wherein said second material is resin, ceramic or thermoplastic material.

22. The row unit according to claim 21, wherein said second material is a thermoplastic material selected from the group consisting of UHMW and PTFE.

* * * * *